United States Patent [19]

Konishi

[11] Patent Number: 4,544,960
[45] Date of Patent: Oct. 1, 1985

[54] ELECTRONIC STILL CAMERA

[75] Inventor: Masahiro Konishi, Minami-ashigara, Japan

[73] Assignee: Fuji Photo Film Co., Ltd., Kanagawa, Japan

[21] Appl. No.: 407,871

[22] Filed: Aug. 13, 1982

[30] Foreign Application Priority Data

Aug. 14, 1981 [JP] Japan .............................. 56-127404

[51] Int. Cl.$^4$ ..................... G11B 27/00; G11B 27/10; H04N 5/782
[52] U.S. Cl. .................................. 360/35.1; 358/335; 358/906; 360/72.1; 360/72.2
[58] Field of Search ..................... 360/72.1, 72.2, 35.1; 358/906, 335

[56] References Cited

U.S. PATENT DOCUMENTS 3,925,815 12/1975 Lemelson ..................... 360/72.2 X
4,163,256 7/1979 Adcock .......................... 358/906 X Primary Examiner—Robert L. Richardson
Attorney, Agent, or Firm—Staas & Halsey

[57] ABSTRACT

An electronic still and/or motion picture camera which is capable of taking a still and motion pictures purely electronically. The camera provided with a magnetic recording unit having a multi-track magnetic head for simultaneously recording image data from a photoelectric conversion unit on a plurality of tracks of a magnetic. The magnetic tape is preformatted with format signals of a frequency lower than an image recording frequency so to have a plurality of record units of a fixed length, each corresponding to one frame. The format signals extend over the entire width of the magnetic tape. The camera also includes a magnetic reproducing circuit for detecting the format signal. The magnetic recording have excellent random accessibility due to the use of the format signals and can be obtained with a miniaturized, inexpensive and low-power-consumption arrangement.

7 Claims, 15 Drawing Figures

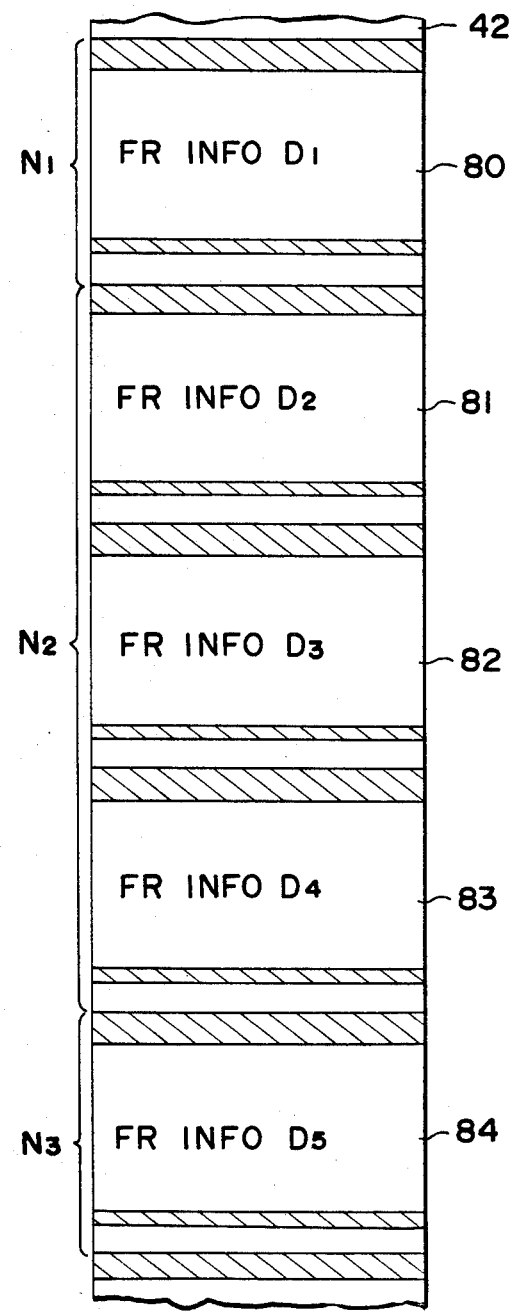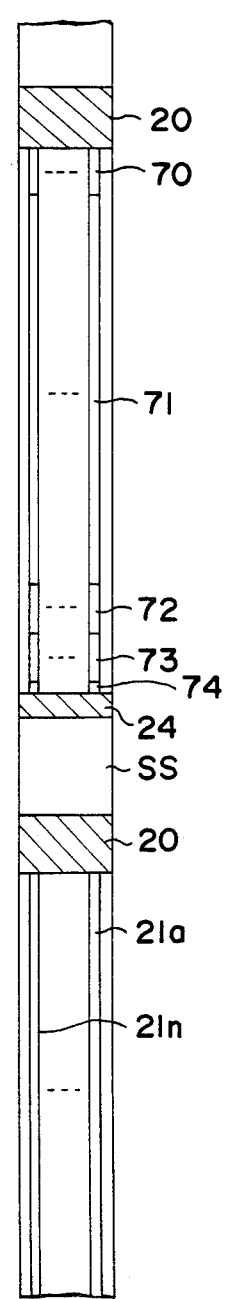

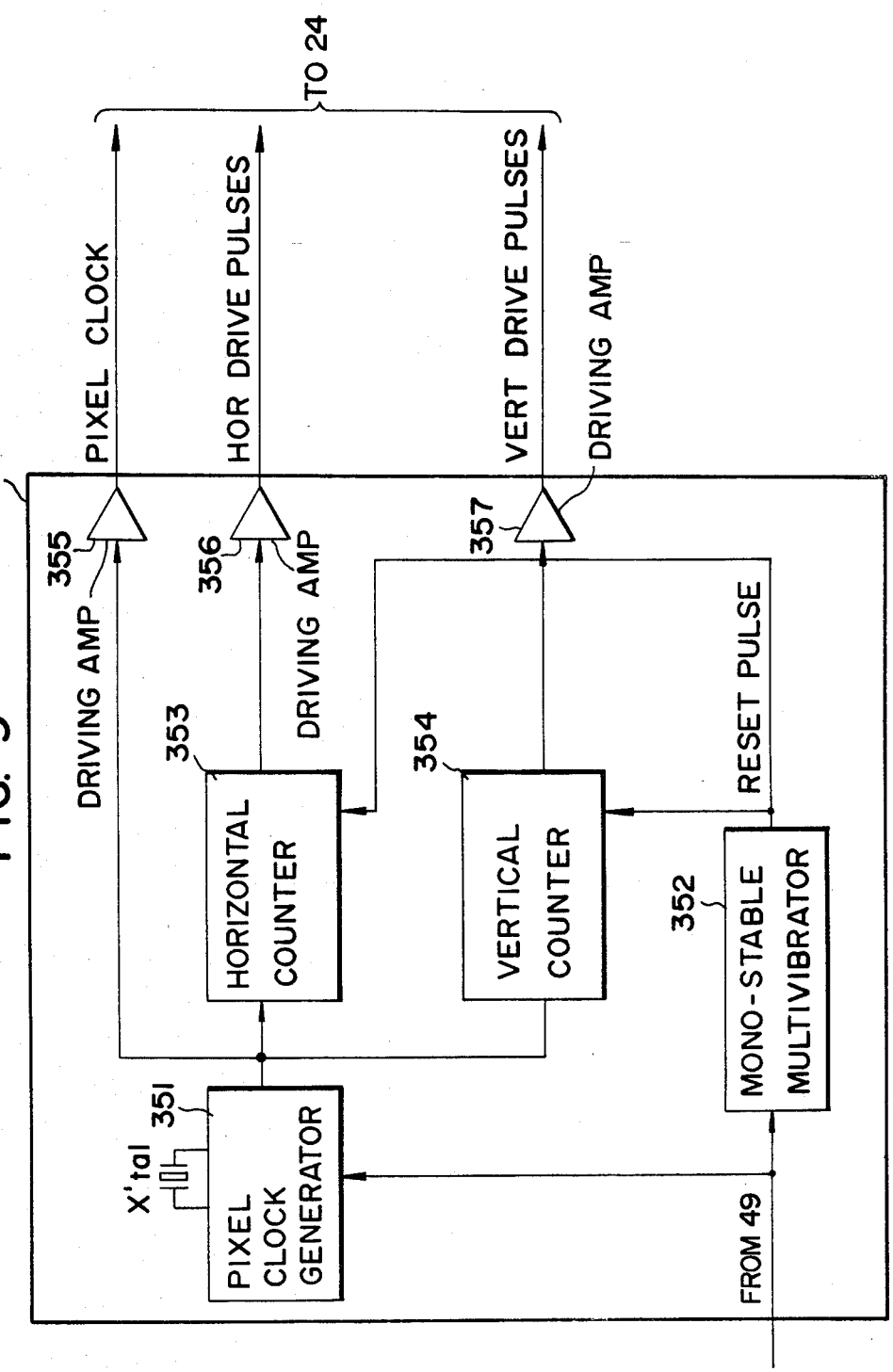

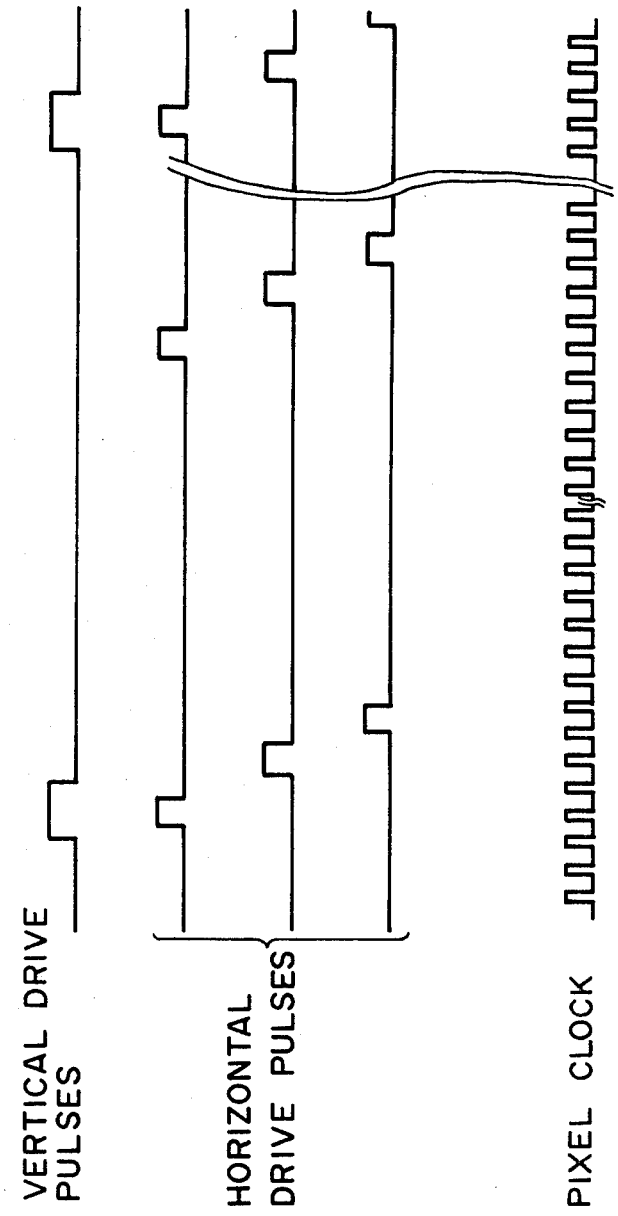

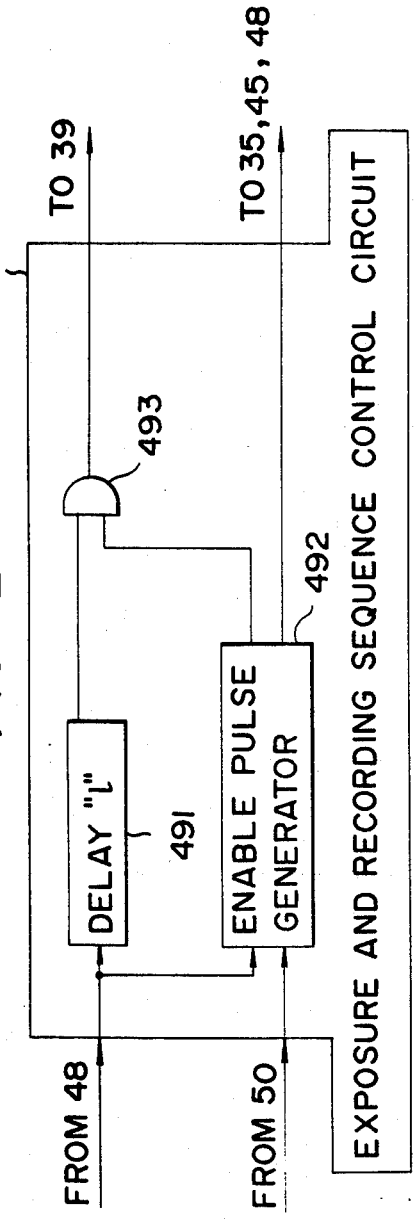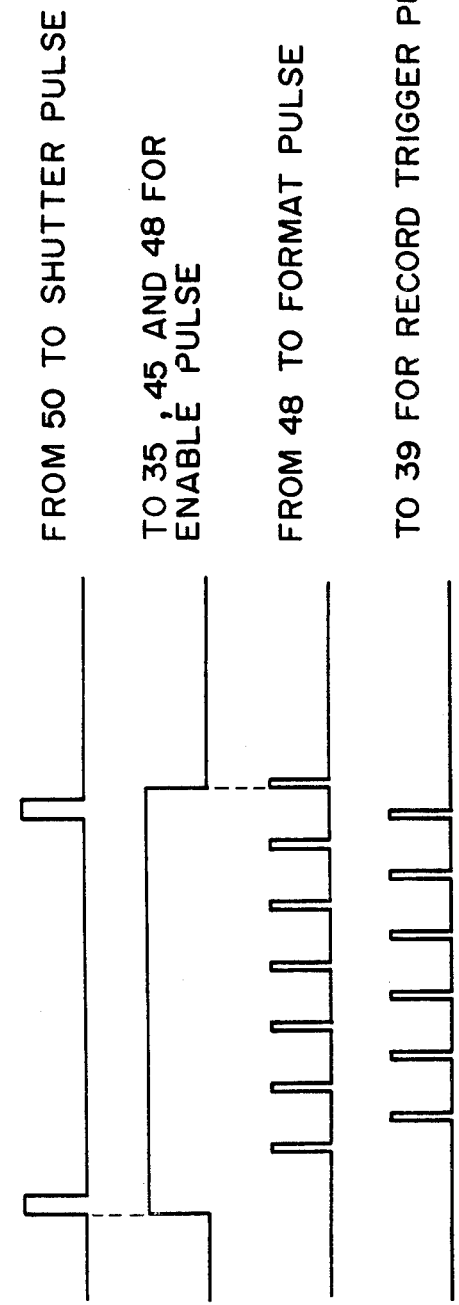

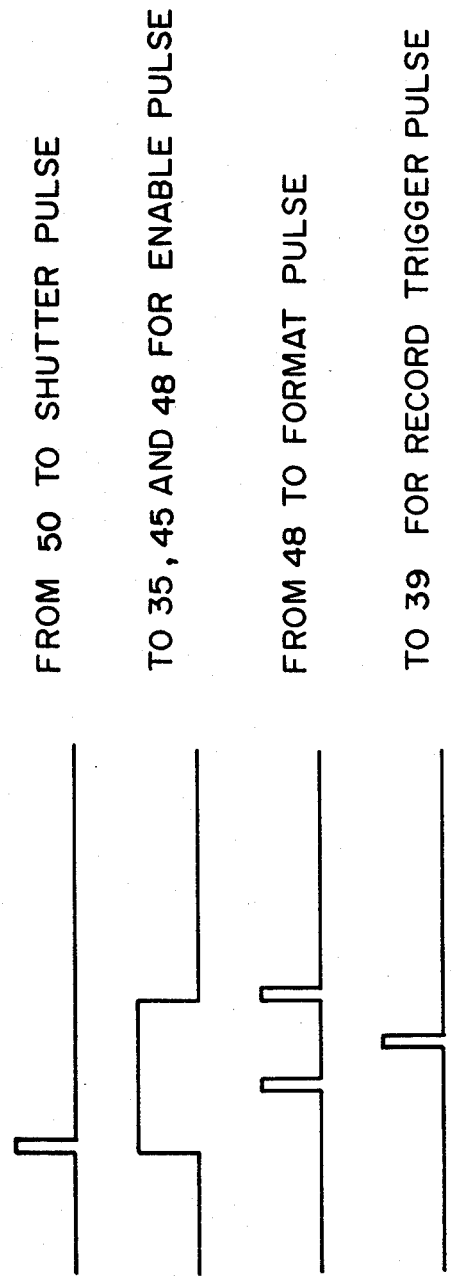
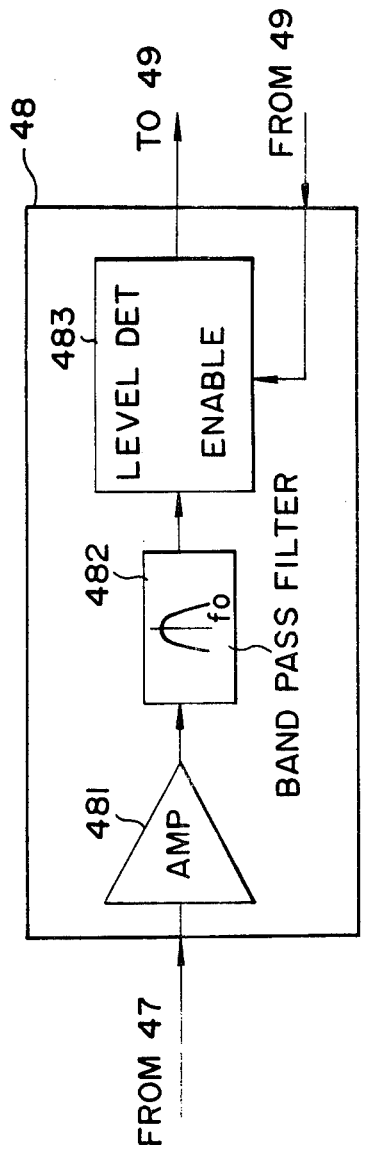

ELECTRONIC STILL CAMERA

BACKGROUND OF THE INVENTION

1. Field of the Invention

The present invention relates to an electronic still camera which permits purely electronic photographing of an object and, more particularly, to improvement in a recording unit of such an electronic camera.

2. Description of the Prior Art

Recently an electronic still camera has been proposed which employs, in combination, an optoelectro transducer, such as a solid state image sensor or pickup tube, and a recording unit using an inexpensive and large-capacity magnetic tape as a recording medium. Such a camera is adapted to take a still picture of an object purely electronically and to record the picture on the magnetic tape so that the image may be reproduced through the use of a separately provided television system or printer. This type of camera is attracting attention as a future substitute for the existing optical camera which involves chemical treatment of the film for development. The electronic still camera, though promising as mentioned above, must be still improved for miniaturization, lower manufacturing cost and less power dissipation before put to practical use. The optoelectro transducer, a control circuit and other electronic circuits can sufficiently be miniaturized and recuded in cost and in power consumption through utilization of recent marked developments in semiconductor integrated circuit technologies. Accordingly, in order to bring a practical electronic still camera to realization, it is necessary that the magnetic tape recording unit including a motor and other electrical devices be adapted for miniaturization, lower cost and lower power consumption.

On the other hand, since still photography is intended primarily for independently observing images of individual frames, it is not suitable, for the reproduction of still images, to employ a motion picture image reproducing method according to which a plurality of closely related recorded images are reproduced in the same sequence as that for recording; namely, there is great need to quickly reproduce an optimum one of a number of frames or a plurality of frames obtained by mutli-exposure photographing one after another. However, a magnetic tape is essentially a sequential file, and hence is difficult to randomly access. Therefore, it is necessary to take some measures to improve its random accessibility for reproducing. It has been regarded as difficult to achieve high random accessibility while fulfilling the requirements for miniaturization, low cost and small power dissipation of the magnetic tape recording device, and no satisfactory electronic still camera has been proposed yet.

SUMMARY OF THE INVENTION

It is therefore an object of the present invention to provide an electronic still camera which is small in size, inexpensive and small in power consumption but which permits magnetic recording of excellent random accessibility for playback so that information of a desired frame can be reproduced immediately.

Briefly stated, the electronic still camera of the present invention is provided with an optical system including a camera lens and other optical means, a photoelectric conversion unit including a sensor for converting an optical image from the optical system to an electric signal, a magnetic recording unit having a magnetic multi-track head for simultaneously recording image data from the photoelectric conversion unit on a plurality of tracks of a magnetic tape, the magnetic tape being preformatted with a format signal of a frequency sufficiently lower than a recording frequency of the image data to have a plurality of recording units of a fixed length, each recording unit corresponding to one frame, a magnetic tape controller for driving the magnetic tape for recording by the magnetic recording unit and stopping the magnetic tape after recording, a magnetic playback circuit for detecting the format signal of the magnetic tape, and a controller for controlling the recording of the image data by the signal detected by the magnetic playback circuit.

It is preferred that each recording unit of the magnetic tape be composed of an image recording area of a fixed length for recording the image data and a start and stop area of a fixed length for starting and braking the magnetic tape. Furthermore, it is desirable that the format signal of the magnetic tape be recorded in a width larger than the width of each track which is formed by the multi-track magnetic head. In particular, it is desirable that the format signal extend across the entire width of the magnetic tape.

BRIEF DESCRIPTION OF THE DRAWINGS

FIGS. 7 and 8 are schematic plan views schematically showing examples of the format of a magnetic tape for use with the present invention;

FIG. 9 is a block diagram illustrating an example of an exposure readout controller used in the embodiment of FIG. 6;

FIG. 10 is a timing chart illustrating the operation of the exposure readout controller depitcted in FIG. 9;

FIG. 12 is a block diagram illustrating an example of a recording sequence control circuit employed in the embodiment of FIG. 6;

FIGS. 13 and 14 are timing charts illustrating the operation of the recording sequence control circuit shown in FIG. 12; and FIG. 15 is a block diagram illustrating an example of a format signal detector utilized in the embodiment of FIG. 6.

DESCRIPTION OF THE PREFERRED EMBODIMENTS

In still photography, since high picture quality is generally required, an optoelectro transducer with a large number of picture elements is needed and the number of quantized bits per picture element must be large. Since the frame speed is as low as 3 to 5 frames per second at maximum, even in the case of multi-exposure photographing the read rate of the optoelectro transducer may be low. Accordingly, by employing, for example, a solid state image sensor having an image storage function, or storing signals from the solid state image sensor in a buffer memory and then reading out therefrom the signals at a low speed, the quantity of information required to be recorded per unit time is reduced. Therefore, the magnetic recording unit, if designed for simultaneous multi-track recording of image data on the magnetic tape through the use of a multi-track magnetic head, may be, for example, a magnetic tape recorder of audio grade. This permits a miniaturization of the magnetic recording unit and a reduction of its cost and power consumption.

A description will be given of conventional means for improving the random accessibility of the magnetic tape for playback. In general, systems for recording data on a magnetic recording medium are roughly divided into (1) systems for recording data on a magnetic recording medium while forming a recording format during recording and (2) systems for preformatting the recording medium and then recording data in the preformatted areas.

Figure 1:
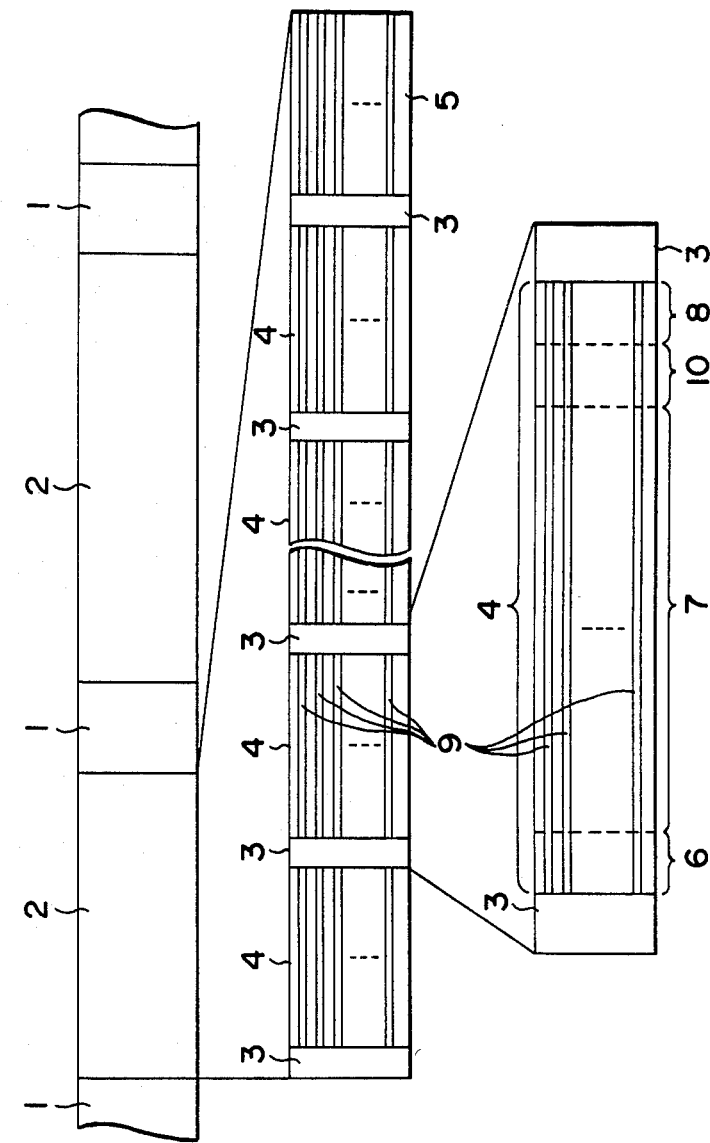
FIG. 1 is a diagram illustrates a system for simultaneously recoring data and forming a recording format signal during magnetic recording.
Figure 2:
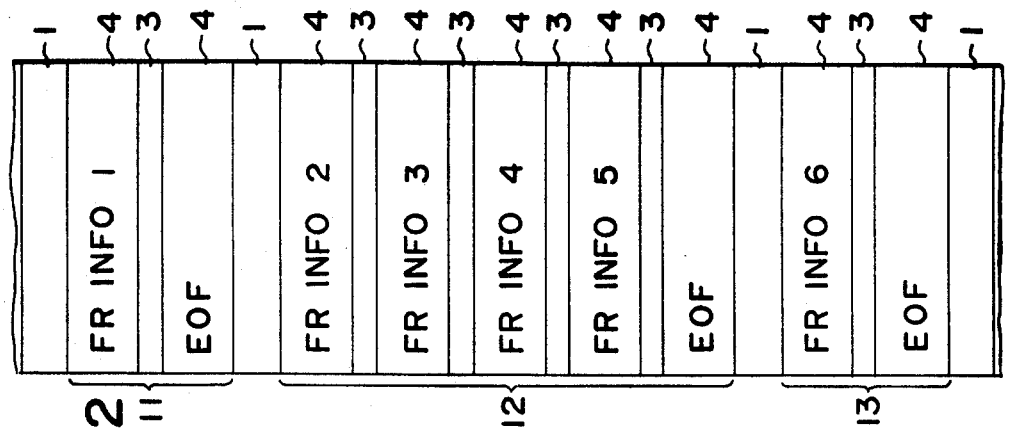
FIG. 2 is a schematic plan view showing the format of a magnetic tape generated by the system of FIG. 1 in an electronic still camera.

The former system is employed in a magnetic tape recording system for a computer, a data recorder and so forth. For instance, as shown in FIG. 1, data to be recorded is divided into predetermined blocks in a sequential order and recorded on each track 9 of a data area 7 and an error detecting code 10, a pre-synchronizing signal 6 and a post-synchronizing signal 8 are added to each divided data block, forming one record unit 4, which is followed by a relatively short record gap 3. Such record units 4 are formed one after another and when recording of the data is completed, a recording unit 5 with an end-of-file code (EOF) indicating the end of the file is formed, thus finishing recording of data in one file 2. The files are separated by a relatively long file gap 1. This system is advantageous in that control for recording is relatively easy, but since the recording format is produced by the magnetic tape recorder, the lengths of the record units and the file gaps are subject to variation due to dispersion in the characteristics of a tape drive device. Consequently, on the side of a playback device for reproducing the data, positional information of the data to be reproduced cannot be accurately recognized, resulting in the defect of a lack of the random accessibility for playback. In the case of applying this system to the electronic still camera, it would be most appropriate to employ the following recording formats: For example, as shown in FIG. 2, one file is used for one photographing and, in the case of single-exposure photography, frame information frame 1 or information 6 is recorded in one record unit 4 and an EOF code is recorded in the next record unit 4, constituting one file as shown by files 11 and 13.

In the case of multi-exposure photographing, one file is formed by record units 4 of the same number as the frames to be photographed and the EOF record unit 4, and the files are isolated from adjacent files by the file gap 1. In this case, however, the lengths of the record units 4, the record gaps 3 and the file gaps 1 are not always fixed owing to dispersion in the characteristics of the magnetic tape recording device. This is all the more true in the case of using the magnetic recorder of audio grade. Accordingly, when it is desired to retrieve an immediately preceding frame, since the distance to its position from the current frame is not available to the reproducing device, the retrieval must be started from the beginning of the tape or a specified file; thus, a long access time is required. This defect is also found in a magnetic tape recorder for large computers. For the reason discussed above, application of this system to the electronic still camera is not proper from the viewpoint of random accessibility.

Figure 3:
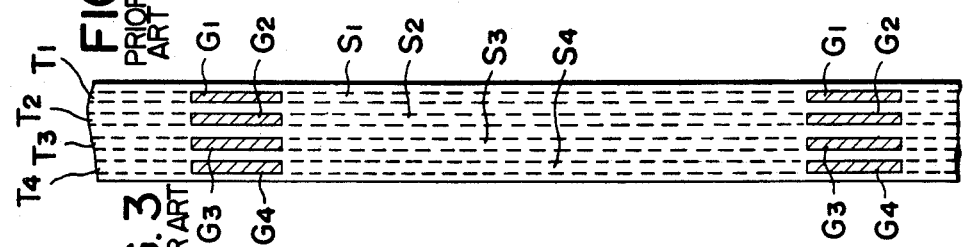
FIG. 3 is a schematic plan view showing several tracks of a conventional magnetic disc.

The system of preformatting the magnetic recording medium is employed, for instance, in a magnetic disc. For example, as shown in FIG. 3, the magnetic recording medium is formatted by recording specified patterns $G_1$ to $G_4$ on tracks $T_1$ to $T_4$, respectively corresponding to scanning positions of magnetic heads. When recording data, the patterns $G_1$ to $G_4$ are reproduced to detect their positions and data is recorded in the detected areas. In this case, since the length of sectors $S_1$ to $S_4$ between the patters and the length of the patterns $G_1$ to $G_4$ are fixed, a reproducing device is able to recognize the distance from the current position to the position of the sector where the data desired to be reproduced is recorded. Although this system is excellent in the random accessibility as described above, it is not preferable to apply such a system to the electronic still camera in which image data is simultaneously recorded on many tracks by the multi-track magnetic head. The reason is that, in order to apply such a system to an electronic still camera, a multi-track reproducing circuit for format signal detection use, which is equipped with the same function as a mutli-track recording circuit, must be incorporated in the electronic still camera primarily for recording use only, thus inevitably resulting in the camera becoming bulky and costly.

As described above, with a mere application of known magnetic recording technologies to the electronic still camera, it is difficult to improve the random accessibility for playback while fulfilling the requirements of miniaturization, low cost and small power dissipation of the magnetic tape recording device.

In view of the above, the present invention provides an improvement of the system of preformatting the magnetic recording medium in that the format signal for formatting the recording medium is recorded at a frequency lower than the frequency for recording image data by the multi-track magnetic head. With such an improvement, the format signal reproducing and detecting circuit of the recording device is markedly simplified, permitting enhancement of the random accessibility for playback while allowing the magnetic tape recording device to be small in size, inexpensive and small in power consumption. The invention will hereinafter be described in detail respect to its various embodiments.

Figure 4:
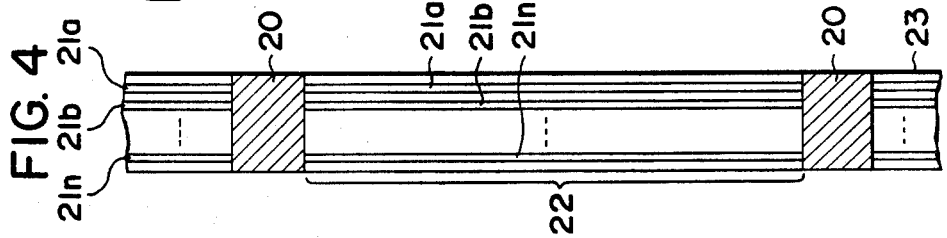
FIGS. 4 and 5 are schematic plan views showing an example of a preformatted magnetic tape for use with the electronic still camera of the present invention.

FIG. 4 is a plan view showing, by way of example, a preformatted magnetic tape for use in the electronic still camera of the present invention. In FIG. 4, references numeral 20 indicates format signals; 21a to 21n designate tracks; 22 identifies a record area; and 23 denotes a magnetic tape. The format signals 20 are recorded on the magnetic tape 23 at regular intervals in its lengthwise direction, defining therebetween the record area 22 which is used as an image data recording area and as a tape starting and stopping area. In the present invention in which the image data are simultaneously recorded on a plurality of tracks, the record area 22 is divided into the tracks 21a to 21n for recording.

The format signals 20 are recorded at a frequency which is much lower than the frequency of the image data (data recording density) which is recorded by a multi-track magnetic head in the record area 22, for example, at a frequency less than 1/10 of the latter. The format signals 20 are recorded during the fabrication of the tape or prior to photographing. The format signals 20 are recorded to extend across the entire width of the magnetic tape 23 unlike in a conventional magnetic disc in which a format signal is recorded with a width equal to that of each track. By recording the format signal with a large width, the SN ratio and other factors can be enhanced during reproducing. Such an effect can be obtained by recording the format signal with a width larger than a single track width of the multi-track tape.

Figure 5:
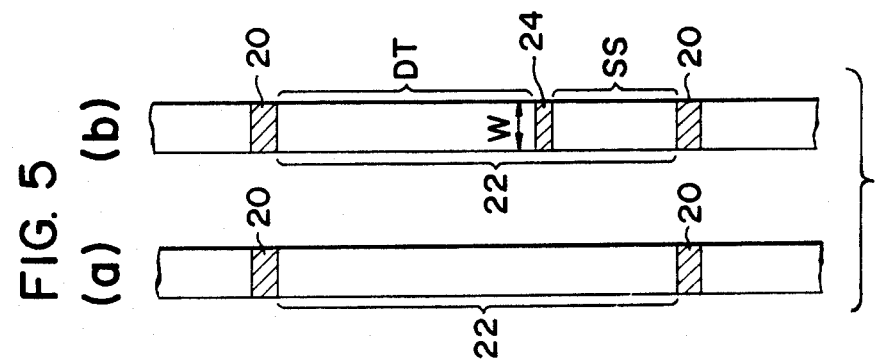

The recording interval of the format signals 20 (the length of the record area 22) is constant as referred to above and it is determined in consideration of the length of data to be recorded and the length of the starting and stopping area necessary for the tape drive mechanism for recording or reproducing. As shown in FIG. 5(b), it is also possible to subdivide the record area 22 into a data area DT and a start and stop area SS using another format signal 24 (which is recorded at a sufficiently low frequency as is the case with the format signal 20 and with a width larger than at least the single track width). Of course, the both areas need not always be separated as shown in FIG. 5(b). The division of the record area 22 is optional according to the recording and reproducing device control system used.

Figure 6:
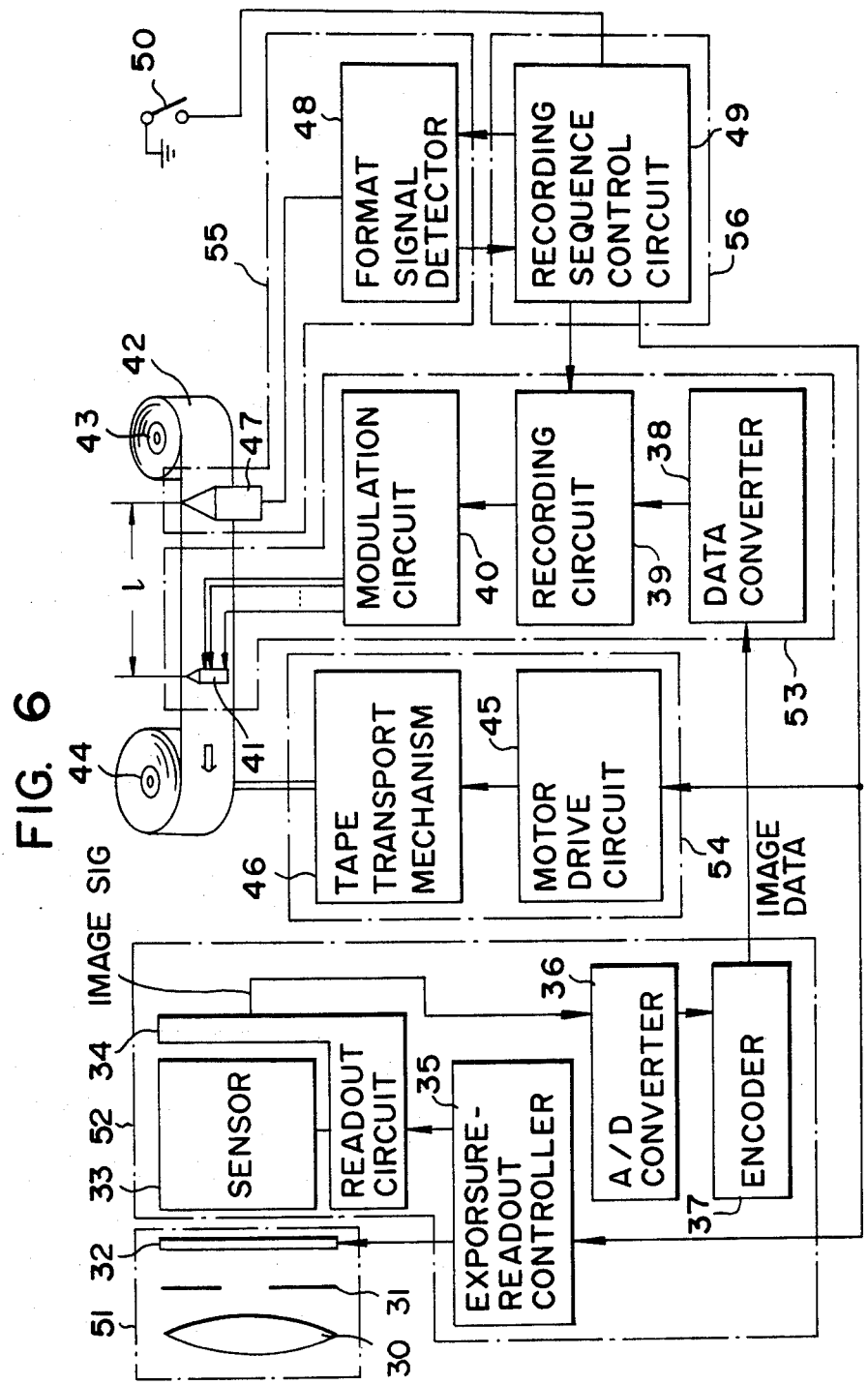
FIG. 6 is a block diagram illustrating the principal parts of an embodiment of the electronic still camera of the present invention.

FIG. 6 is a block diagram illustrating the principal portions of an embodiment of the electronic still camera of the present invention. In FIG. 6, reference numeral 30 indicates a camera lens; 31 designates a diaphragm; 32 identifies a shutter; 33 denotes a sensor; 34 represents a readout circuit; 35 shows an exposure readout controller; 36 refers to an A/D converter; 37 signifies an encoder; 38 indicates a data converter; 39 designates a recording control circuit; 40 identifies a channel (or modulation) encoder circuit; 41 denotes a multi-track magnetic head; 42 represents a magnetic tape; 43 shows a supply reel; 44 refers to a take-up reel; 45 signifies a motor drive circuit; 46 indicates a tape transport mechanism; 47 designates a magnetic head for detecting the format signal; 48 identifies a format signal detecting circuit; 49 denotes a recording sequence control circuit; 50 represents a shutter button; 51 refers to an optical system; 52 refers to a photoelectric conversion unit; 53 refers to a magnetic recording unit; 54 refers to a magnetic tape control mechanism; 55 refers to a magnetic reproducing unit; and 56 refers to a controller.

As illustrated in FIG. 6, the electronic still camera of this embodiment is provided with the optical system 51 composed of the camera lens 30, the diaphragm 31 and the shutter 32; the photoelectric conversion unit 52 includes sensor 33 for converting an optical image from the optical system 51 into an electric or electrical signal; the magnetic recording unit 53 includes the multi-track magnetic head 41 for simultaneously recording image data from the photoelectric conversion unit 52 on the preformatted multi-track magnetic tape 42 described previously with respect to FIGS. 4 and 5; the magnetic tape drive and stop mechanism 54 for driving the magnetic tape 42 for recording thereon by the magnetic head 41 and stopping the magnetic tape 42 after recording; the magnetic reproducing unit 55 for detecting the format signal on the magnetic tape 42; and the controller 56 for controlling the recording of the image data in accordance with the signal detected by the magnetic reproducing device 55.

In FIG. 6, prior to starting photographing, the shutter 32 is closed and the magnetic tape 42 stands still and, further, the magnetic reproducing unit 55 is also out of operation. Upon pressing the shutter button 50, the recording sequence control circuit 49 starts the exposure readout control circuit 35, the motor drive circuit 45 and the format signal detecting circuit 48. The exposure readout control circuit 35 opens the shutter 32 for a period of time corresponding to the quantity of light necessary to project an optical image of an object onto the image pickup surface of the sensor 33, such as a CCD, BBD or the like, for photoelectric conversion. Additionally, the motor drive circuit 45 drives the tape transport mechanism 46, by which the magnetic tape 42 is caused to travel while being fed from the reel 43 and taken up on the reel 44.

The image information stored in the sensor 33 is read out serially as image signals in a sequential order by the readout circuit 34 and converted by the A/D converter 36 to digital form and then encoded by the encoder 37 into image data. Thereafter the image data is converted by the data converter 38 into a form suitable for simultaneous multi-track recording and, at the same time, an error detecting code is generated and added to the image data.

Furthermore, the format signal detector 48, when started, begins to reproduce the format signals on the magnetic tape 42 with the magnetic head 47. Upon detecting the format signal 20 recorded on the magnetic tape 42, the format signal detector 48 applies information to the recording sequence control circuit 49, which in turn activates the recording control circuit 39 after an elapsed time corresponding to the distance l between the magnetic head 47 for the format signal detecting use and the magnetic head 41 for multi-track data recording use. As a result of this, the image data from the data converter 38 is encoded by the channel encoder circuit 40 into a form suitable for magnetic recording, thereafter being recorded in the data area on the magnetic tape 42.

For instance, in the case where the magnetic tape 42 is the type shown in FIG. 5(b), its travel is stopped by a stop signal which is provided from the recording sequence control circuit 49 to the motor drive circuit 45 when the format signal 24 is detected by the format signal detector 48. In the case of the magnetic tape 42 being the type shown in FIG. 5(a), the tape is stopped by a signal from the data converter 38 when recording of the data is completed.

Moreover, in the case where the shutter button 50 is being depressed, the recording sequence control circuit 49 performs an operation in a multi-exposure mode in which the aforementioned operations, such as opening and closing of the shutter 32, readout of data from the sensor 33, conversion and recording of the image data and so forth, are repeated. Accordingly, even if the format signal 24 of the magnetic tape 42 is detected, it is neglected and the magnetic tape 42 is kept running at a constant speed regardless of the start and stop area SS thereof. Incidentally, switching between the multi-exposure and the single-exposure mode may also be effected by means of a separately provided switch.

FIG. 7 is a plan view showing an example of the recording format of the magnetic tape according to the present invention. One record area between the individual format signals 20 corresponds to one frame and, in the data area between the format signals 20 and 24, a pre-synchronizing signal 70, image data 71, an error detecting code 72 and a post-synchronizing signal 73 are respectively recorded on the plurality of tracks 21a to 21n. Reference numeral 74 indicates a jitter absorption area which is provided as required, and SS designates a tape start and stop area.

FIG. 8 shows the format of the magnetic tape 42 in the case where single-exposure photographing N1 was followed by mutli-exposure photographing N2 and single-exposure photographing N3. In record area 80 is recorded frame information $D_1$ obtained by the single-exposure photographing N1; in record areas 81 to 83 are recorded frame information $D_2$ to $D_4$ obtained by the multi-exposure photographing N2; and in a record area 84 is recorded frame information $D_5$ obtained by the single-exposure photographing N3. In this way, even in the case of multi-exposure photographing, each frame is recorded independently of the other frames, and hence can freely be reproduced at high speed. Moreover, in the case of the multi-exposure mode, it is also possible that closely relates images obtained by multi-exposure photographing are reproduced in succession in a movie mode.

FIG. 9 is a block diagram illustrating an example of the exposure readout controller 35 utilized in the embodiment of FIG. 6, and FIG. 10 is a timing chart showing pixel clock pulses, horizontal drive pulses and vertical drive pulses in the case where the sensor 33 in the embodiment of FIG. 6 is formed of 384 pixels in the horizontal direction and 262 pixels in the vertical direction. In FIG. 9, reference numeral 351 indicates a pixel clock generator which is controlled by the output from the recording sequence control circuit 49; 352 designates a monostable multivibrator which is also controlled by the output from the recording sequence control circuit 49; 353 identifies a horizontal counter for producing the vertical drive pulses; 354 denotes a vertical counter for producing the vertical drive pulses; and 355 to 357 represent driving amplifiers. The horizontal counter 353 and the vertical counter 354 are reset by reset pulses from the monostable multivibrator 352.

Figure 11:
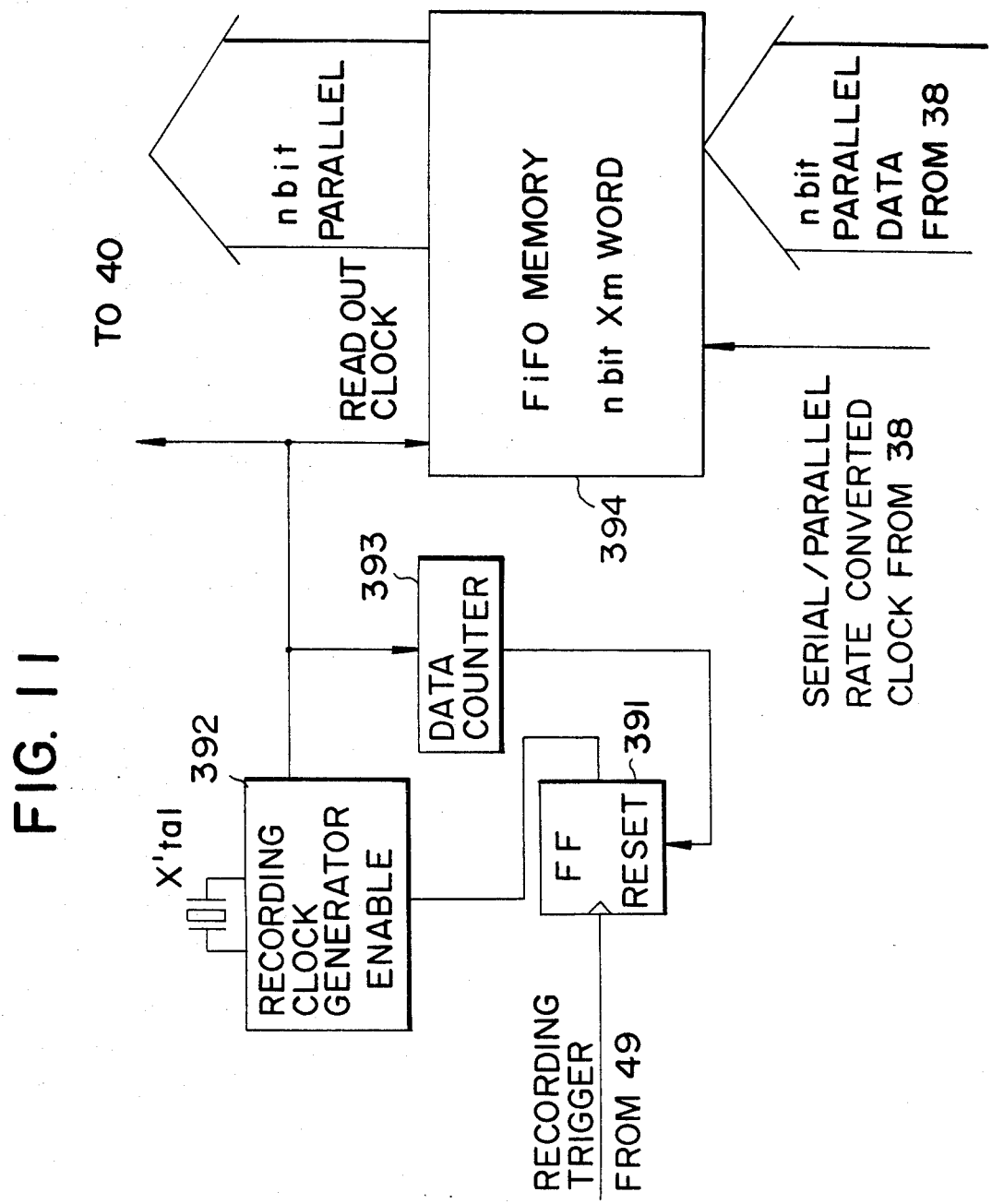
FIG. 11 is a block diagram illustrating an example of a recording control circuit used in the embodiment of FIG. 6.

FIG. 11 is a block diagram illustrating an example of the recording control circuit 39 employed in the embodiment of FIG. 6. In FIG. 11 reference numeral 391 indicates a flip-flop; 392 designates a recording clock generator; 393 identifies a data counter; and 394 represents a FiFO memory, which has a capacity of n bits × m words when the number of recording tracks in n.

FIG. 12 is a block diagram illustrating an example of the recording sequence control circuit 49 used in the embodiment of FIG. 6. In FIG. 12 reference numeral 491 indicates a delay circuit for delaying a signal from the format signal detector 48 for a period of time corresponding to the aforementioned distance l between the magnetic heads 41 and 47 in FIG. 6; 492 designates an enable pulse generator; and 493 identifies an AND circuit. FIG. 13 is a timing chart showing the operation of the recording sequence control circuit 49 in the case of multi-exposure photographing, and FIG. 14 is a timing chart showing the operation of the recording sequence control circuit 49 in the case of single-exposure photographing.

FIG. 15 is a block diagram illustrating an example of the format signal detector 48 utilized in the embodiment of FIG. 6. In FIG. 15 reference numeral 481 indicates an amplifier; 482 designates a band-pass filter which has a center frequency $f_0$ equal to the recorded formatting-pattern frequency; and 483 identifies a level detector.

As will be appreciated from the foregoing description, according to the present invention, since image data is recorded in each data area of a magnetic tape preformatted by format signals to have a plurality of record units of a fixed length, each corresponding to one frame. Frame information is thus recorded at a predetermined position on the magnetic tape allowing a reproducing device to accurately recognize the position of data to be reproduced, providing for enhanced random accessibility for playback. Furthermore, since the format signals for indicating the position where data is to be written are recorded across the entire width of the tape and thus all tracks at a frequency sufficiently lower than the actual image data recording density, the magnetic reproducing unit for detecting the format signal may be of a simple-structure for reproducing a single track. Accordingly, by applying the present invention to an electronic still camera utilizing the multi-track simultaneous recording system, it is possible to obtain an electronic still camera which is small, inexpensive and low in power consumption but excellent in random accessibility and enables reproduction of images of motion pictures mixed in images of still pictures.

It will be apparent that many modifications and variations may be effected without departing from the scope of the novel concepts of the present invention.

What is claimed is:

1. An electronic still camera, comprising:
   an optical system;
   a photoelectric conversion unit including a sensor for converting an optical image from the optical system into electrical signals corresponding to image data;
   a magnetic recording unit, operatively connected to the photoelectric conversion unit, having a multi-track magnetic head for simultaneously recording the image data from the photoelectric conversion unit on a plurality of tracks of a magnetic tape, the magnetic tape having a width and being preformatted with format signals of a frequency lower than an image data recording frequency, the format signals extending over the entire width of the magnetic tape and defining a plurality of record units of a fixed length, each record unit corresponding to one frame;
   a magnetic reproducing circuit for detecting the format signals on the magnetic tape;
   a controller, operatively connected to the magnetic recording unit and the magnetic reproducing unit, for controlling the recording of the image data in accordance with the format signals detected by the magnetic reproducing circuit; and
   a magnetic tape drive unit, operatively connected to the controller, for driving the magnetic tape for recording and stopping the magnetic tape after recording.

2. An electronic still camera according to claim 1 wherein each record units of the magnetic tape is composed of an image recording area of a fixed length for recording the image data and a start and stop area of a fixed length for starting and stopping the travel of the magnetic tape.

3. An electronic still camera according to claim 1, wherein the magnetic recording unit includes a simple recording device of audio grade and wherein the magnetic reproducing circuit includes a simple reproducing device of audio grade.

4. An electronic still and motion picture electronic camera, comprising:
an optical system;
a photoelectric conversion unit including a sensor for converting an optical image from the optical system into electrical signals corresponding to image data;
a magnetic recording unit, operatively connected to the photoelectric conversion unit, having a multi-track magnetic head for simultaneously recording the image data from the photoelectric conversion unit on a plurality of tracks of a magnetic tape, the magnetic tape having a width and being preformatted with format signals of a frequency lower than an image data recording frequency, the format signals extending over the entire width of the magnetic tape and defining a plurality of record units of a fixed length, each record unit corresponding to one frame, the magnetic recording unit recording still pictures on individual frames and motion pictures on a plurality of successive frames;
a magnetic reproducing circuit for detecting the format signals on the magnetic tape;
a controller, operatively connected to the magnetic recording unit and the magnetic reproducing unit, for controlling the recording of still pictures and motion picture image data in accordance with the format signals detected by the magnetic reproducing circuit; and
a magnetic tape drive unit, operatively connected to the controller, for driving the magnetic tape for recording and stopping the magnetic tape after recording.

5. An electronic still and motion picture camera according to claim 4, wherein each record unit of the magnetic tape is composed of an image recording area of a fixed length and a start and stop area of a fixed length and wherein the start and stop area has start and stop signals for starting and stopping the magnetic tape drive unit.

6. An electronic still and motion picture camera according to claim 5, wherein the controller stops the magnetic tape drive unit in accordance with each stop signal for still photography and wherein the controller disregards the stop signals for motion picture photography.

7. An electronic still and motion picture camera according to claim 4, wherein the magnetic recording unit includes a simple recording device of audio grade and wherein the magnetic reproducing circuit includes a simple reproducing device of audio grade.

* * * * *

UNITED STATES PATENT AND TRADEMARK OFFICE
CERTIFICATE OF CORRECTION

PATENT NO. : 4,544,960
DATED : October 1, 1985
INVENTOR(S) : Konishi

It is certified that error appears in the above-identified patent and that said Letters Patent is hereby corrected as shown below:

```
Front page, [57] ABSTRACT, line 7, after "netic"
              insert --tape--.

Col. 3, line 55, delete "frame" (second occurrence).

Col. 5, line 39, delete "(or";
        line 40, delete "modulation"; after "encoder"
              insert --(or modulation)--.
```

Signed and Sealed this

Eighteenth Day of February 1986

[SEAL]

Attest:

DONALD J. QUIGG

Attesting Officer

Commissioner of Patents and Trademarks